United States Patent [19]

Graham

[11] 4,185,138

[45] Jan. 22, 1980

[54] SIZE COMPOSITION AND METHOD OF PRODUCING SAME TO RENDER GLASS FIBER HAVING IMPROVED DISPERSIBILITY IN AQUEOUS SOLUTIONS

[75] Inventor: Roy R. Graham, Lexington, N.C.

[73] Assignee: PPG Industries, Inc., Pittsburgh, Pa.

[21] Appl. No.: 971,454

[22] Filed: Dec. 20, 1978

[51] Int. Cl.$^2$ .......................... B32B 9/00; D02G 3/00
[52] U.S. Cl. ........................... 428/391; 260/29.6 NR; 428/378; 428/392
[58] Field of Search ............... 428/375, 378, 391, 392; 260/29.6 NR; 65/3 C

[56] References Cited

U.S. PATENT DOCUMENTS

| | | | |
|---|---|---|---|
| 2,728,737 | 12/1955 | Wittcoff | 260/17 R |
| 2,778,764 | 1/1957 | Morrison | 428/378 |
| 2,811,459 | 10/1957 | Wittcoff | 260/29.6 NR |
| 2,895,786 | 7/1959 | Schlack | 260/29.6 NR |
| 3,168,389 | 2/1965 | Eilerman | 428/378 |
| 3,355,409 | 11/1967 | Bissot | 260/29.6 NR |
| 3,461,090 | 8/1969 | Haynes et al. | 428/375 |
| 3,556,754 | 1/1971 | Marsden et al. | 260/29.6 NR X |
| 3,676,287 | 7/1972 | Flautt et al. | 428/392 X |
| 3,702,844 | 11/1972 | Ofstead | 260/29.6 NR |
| 3,810,784 | 5/1974 | Wong et al. | 428/392 X |
| 3,814,792 | 6/1974 | Arakawa et al. | 260/29.6 NR |
| 3,840,426 | 10/1974 | Flautt et al. | 428/392 X |
| 3,864,155 | 2/1975 | Graham | 428/378 |
| 3,869,308 | 3/1975 | Graham | 428/378 |
| 3,914,192 | 10/1975 | Flautt et al. | 428/392 X |
| 3,948,673 | 4/1976 | Chase et al. | 428/378 X |

*Primary Examiner*—Lorraine T. Kendell
*Attorney, Agent, or Firm*—Kenneth J. Stachel

[57] ABSTRACT

A sized composition and method of making same is provided for rendering sized glass fibers that have improved dispersibility in aqueous solutions. The size composition has about 35 to about 90 weight percent of the polyvinyl alcohol; and about 3 to about 14 weight percent of a polyamino functional polyamide resin; and about 1 to about 4 weight percent of an organic carboxylic acid having 1 to 5 carbon atoms, which is used to react with the polyamino functional polyamide resin to produce the carboxylic acid salt of the polyamino functional polyamide resin, wherein the amount of polyvinyl alcohol is at least about 5 times the amount of polyamide resin; and about 1 to about 10 weight percent of a nonionic wetting agent; about 0.5 to about 3 weight percent of an amino-alkyl-alkoxy-silane and about 5 to about 30 weight percent of an alkyl imidazoline textile softener. These weight percents are based on the non-aqueous components in the aqueous size solution. Also a anti-foaming agent may be incorporated into the size composition in an amount of about 0.1 to about 1 weight percent.

12 Claims, No Drawings

SIZE COMPOSITION AND METHOD OF PRODUCING SAME TO RENDER GLASS FIBER HAVING IMPROVED DISPERSIBILITY IN AQUEOUS SOLUTIONS

BACKGROUND OF THE INVENTION

The present invention is directed to a size composition and method of producing same for application to glass fibers to produce sized glass fibers with improved dispersibility in aqueous solutions. More particularly, the present invention is directed to a sizing composition and method for producing same for producing sized glass fibers having improved water dispersibility for the formation of paper-like sheet material.

Glass fibers have found application in producing paper-like sheet material composed of either 100 percent glass fibers or a combination of glass fibers along with cellulose fibers. One hundred percent glass paper is a high strength paper and is used as air or liquid filtration papers. When glass fibers are used in combination with natural cellulose fibers including all of the various grades of pulp, the glass fibers are usually of a finer fiber diameter that are more like paper making fibers in length and diameter distribution than the usual diameter distribution for glass fibers. The combination of glass fibers with cellulose fibers have generally improved the drainage, wet strength, and dimensional stability of the resultant paper product.

Also glass fibers are being used as a replacement for asbestos fibers, which although being successful as a reinforcement for many types of materials because of their ability to disperse and to provide some entangled network, have recently been associated with various health problems.

The glass fibers differ from natural cellulose fibers or asbestos fibers in that they are more difficult to disperse in water, and they do not fibrillate in the usual paper making sense. The dispersion problem occurs when a slush, an aqueous solution with dispersed fibers, of glass fibers or a combination of glass fibers and cellulose fibers is prepared as a preliminary step to the formation of a wet web. The dispersion problem is caused by sveral factors including the longer length of the glass fibers, the electrical charges on the fiber, the differing water absorption characteristics, and the presence of textile sizes or finishes on the glass fibers.

Typically to improve dispersibility of the fibers additional chemicals have been employed in synthetic papers, and these chemicals include dispersing agents, or glass fibers have been produced without the use of any additional chemicals. These agents may be anionic, cationic or nonionic depending on the nature of the fiber, and they may be supplied as a finish on the fiber, but are more commonly added separately to the system. The development of a binding agent like the water-dispersible starch binders for glass fibers have improved the dispersion of the glass fibers in water over the previously used chrome or silane type glass fiber binders. Another approach to improving the dispersibility of glass fiber binders is to produce the glass fibers by flame attenuation. This process produces virgin glass fibers having no surface coating.

The glass fibers produced with a water-dispersible starch binder or virgin glass fibers have not proven satisfactory when the glass fibers have a larger fiber diameter than the micro fibers, i.e., a fiber diameter up to around 6.4 microns, because of the inherent poorer dispersibility of the larger diameter glass fibers in aqueous solution. The larger size glass fibers in the form of fiber glass paper would be an excellent replacement for asbestos fiber paper in such applications as backing or tile floor covering such as vinyl floor covering. But the production of such a glass fiber paper requires a slush which is a stable fiber dispersion. The glass fiber dispersion of virgin glass fibers and glass fibers coated with a water dispersible starch binder have not proven satisfactory.

It is an object of the present invention to provide a glass fiber size composition which yields a size glass fiber with superior water dispersibility.

It is a further object of this invention to produce chopped, sized glass fiber strand products which have superior water dispersibility to enable their use in the formation of a slush which is a stable fiber dispersion to form glass fiber paper useful as a backing material for vinyl floor covering.

It is an additional object of the present invention to provide a sized glass fiber having a fiber diameter of greater than around 6.4 microns that have good water dispersibility and can be used in the production of glass fiber paper or synthetic paper containing a combination of glass fibers and cellulose fibers.

SUMMARY OF THE INVENTION

The aforementioned objects of the invention are achieved by providing a glass fiber size composition having critical amounts of a polyvinyl alcohol resin, a polyamide resin, a nonionic wetting agent, and amino-alkyl alkoxy silanes, a textile softener, and a small amount of an organic carboxylic acid.

The glass fiber size composition has the following components in weight percents based on the non-aqueous components of the size:
  about 35 to about 90 weight percent of a polyvinyl alcohol resin,
  about 3 to about 14 weight percent of a polyamide resin wherein the amount of polyvinyl alcohol resin is at least about 5 times the amount of polyamide resin,
  about 1 to about 8 weight percent of an organic carboxylic acid having one to five carbon atoms,
  about 1 to about 10 weight percent of a nonionic wetting agent,
  about 0.5 to about 3 weight percent of an amino-alkyl alkoxy silane, and
  about 5 to about 30 weight percent of a textile softener.

Also, an anti-foaming agent may be added in an amount of about 0.1 to about 1 weight percent.

In the method for producing the glass fiber size composition, a portion of the carboxylic acid is added with the polyamide resin to form the water soluble acid salt of the polyamide resin to be combined with the polyvinyl alcohol resin, wetting agent, silane, and textile softener anti-foaming agent. The other portion of the acid is used to adjust the pH of the glass fiber size composition before it is used to contact the glass fibers.

The sized glass fibers are produced by contacting the glass fibers, which are formed by being drawn from a molten cone of glass located at a bushing, with the glass fiber size composition of the present invention and then a number of glass fibers are drawn together by a gathering shoe into one or more glass fiber strands. Then the glass fiber strands are either wound on a forming package and dried, then chopped into glass fiber segments, or wet chopped after the formation of the glass fiber strands and dried. The glass fibers sized with the sizing composition of the present invention have improved dispersibility in aqueous solutions used in making 100% percent glass fiber paper or a synthetic paper containing glass fiber combined with other fibers such as cellulose fibers.

DETAILED DESCRIPTION OF THE INVENTION

The polyamide resin useful in the size composition in the present invention is a polyamino-functional polyamide resin which can be any such resin but preferably is one which has an amino value between 100 and 400. These resins are formed normally by the condensation reaction of a polycarboxylic acid such as dimerized or trimerized fatty acid and a polyamine such as tetraethylene pentamine, ethylene triamine, diethylene triamine, diethylene tetramine and the like. The polyamide resin is preferably used as the salt of a carboxylic acid and the polyamino-functional polyamide resin. The carboxylic acid constituent is chosen from the group of organic carboxylic acids having 1 to 5 carbon atoms such as formic acid, acetic acid, acrylic acid, methacrylic acid, butyric acid, chloroacetic acid, pentanoic acid or the like. The preferred organic carboxylic acid is acetic acid to form the acetate salt of the polyamino functional polyamide resin. The preferred polyamino functional polyamide resin is that which is commercially available under the registered trademark Versamide ® polyamide resins and in particular Versamide ® 140 resin.

The polyvinyl alcohol useful in the size composition of the present invention is preferably derived from polyvinyl acetate by a hydrolysis process and is commercially available in a wide variety of grades according to the various degress of hydrolysis and viscosity. The preferred polyvinyl alcohol useful in the size composition of the present invention is the polyvinyl alcohol commercially available under the name Gelvatol The polyvinyl alcohol useful in the size composition of the present invention is preferably derived from polyvinyl acetate by a hydrolysis process and is commercially available in a wide variety of grades according to the various degrees of hydrolysis and viscosity. The preferred polyvinyl alcohol useful in the size composition of the present invention is the polyvinyl alcohol commercially available under the name Gelvatol 1-30 available from Monsanto Company. Other commercially available grades of polyvinyl alcohol that could be used in the sized composition of the present invention include the polyvinyl alcohol available under the trade name "Elvanol" by the E. I. Du pont de Memours and Company. These polyvinyl alcohols range in a degree of hydrolysis from about 98 to 100 percent hydrolysis of the polyvinyl acetate. Polyvinyl alcohols with a lesser degree of hydrolysis can be used but it is preferred to use the polyvinyl alcohols with the higher degree of hydrolysis since the increased degree of hydrolysis is accompanied by an increased water solubility. The viscosity of the polyvinyl alcohol should be a medium to relatively high viscosity and molecular weight. Viscosity in the range of about 15 to about 70 centipose, by the Hooppler falling ball test method, is a medium viscosity range for the polyvinyl alcohol. The amount of polyvinyl alcohol used must be at least 5 times the amount of the polyamide used in the sizing composition of the present invention. It is believed that the ratio amounts of polyvinyl alcohol to polyamide resin used in the size composition of the present invention aid in producing a sized glass fiber with improved dispersion properties in aqueous solution. The amount of polyvinyl alcohol used in the size composition of the present invention is in the range of about 35 to about 90 weight percent of the non-aqueous components of the size composition.

The nonionic wetting agent useful in the size composition of the present invention includes polyalkylene derivatives of esters, fatty acids, fatty alcohols, fatty amides, alkyl phenyl ethers, e.g. Igepal CA-630, an octyl phenoxypoly-(ethylenoxy)ethanol, which is the preferred nonionic wetting agent. Other nonionic wetting agents known to those skilled in the art can be used in the size that permit adequate wetting of the sizing ingredients to the glass surface. Suitable amounts of wetting agent range from about 1 to about 10 weight percent of the non-aqueous constituents of the size composition.

The amino-alkyl alkoxy silane which are contemplated for use on the present invention are illustrated by the following structural formula:

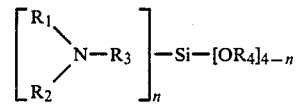

wherein $R_1$ may be hydrogen, an alkyl radical containing 1 to 5 carbon atoms, or $H[NH\ CH_2-CH_2]$, where x is 1 to 5; $R_2$ may be hydrogen or an alkyl radical containing 1 to 5 carbon atoms, $R_3$ and $R_4$ are alkyl radicals preferably containing 1 to 5 carbon atoms and n is a whole number from 1 to 3 preferably 1. Typical examples of the amino-alkyl alkoxy silanes include gamma-amino-propyl triethoxysilane and similar silanes used in the manner shown in U.S. Pat. No. 2,832,754. The preferred amino-alkyl alkoxy silane is the gamma-amino-propyl triethoxy silane.

The textile softener contemplated for use in the size composition of the present invention is Cation X softener or other various textile softeners which are equivalent to Cation X in amounts which are sufficient to provide a softening action to the sized glass fiber strand. These amounts are in the range of about 5 to about 30 weight percent of the non-aqueous constituents in the size composition. Suitable textile softeners are the alkyl imidazoline derivatives such as described in U.S. Pat. Nos. 2,200,815; 2,267,965; 2,268,273 and 2,355,837. Cation X softener is an example of such material wherein the alkyl imidazoline derivative is the reaction product of stearic acid, tetraethylene pentamine and acetic acid. Acid solublized water soluble dispersible stearic amides and anhydride, acid solubilized, water dispersible lower molecular weight fatty acid amides, as well as anhydrous acid solubilized, polyunsaturated, lower molecular weight fatty acid amides can also be used as the textile softener.

In the preferred size composition of the present invention a minute quantity of an anti-foaming agent is added to the composition to avoid any problem with foaming. Any conventional anti-foaming agent that has been known to be used in size compositions can be used in the size composition of the present invention. It is preferred to use an anti-foam emulsion containing a silicone oil, filler and emulsion stabilizer in an aqueous solution. This antifoam emulsion is available commercially under the brand name SAG-470 available from Union Carbide Corporation. The amount of anti-foaming agent used is in the range of about 0.1 to about 1 weight percent of the size composition.

In addition to the organic carboxylic acid having 1 to 5 carbon atoms that was added to the polyamino-functional polyamide resin to form a salt, the organic carboxylic acid is also added in a sufficient quantity to adjust the pH of the size composition of the present invention. The pH of the final composition should be in the range of about 4 to around 7. The total solids (non-aqueous) content of the aqueous size of the invention is about 2 to 20 percent by weight of the sizing solution, preferably about 3 to 10 percent by weight of the sizing solution. In all events the total solids should be adjusted to a level whereby the viscosity of the sizing solution is acceptable for application to the glass fibers i.e. 10 to 50 centipoise at 60° C.

Any method for forming size compositions can be used in preparing the size composition of the present invention where a portion of the organic carboxylic acid is used to react with the polyamide resin to form a salt of the polyamide resin and a portion of organic carboxylic acid is used to adjust the pH of the final size composition to a pH in the range of about 4 to about 7.

The following preferred method of forming the size composition of the present invention is illustrative of one method of practicing the instant invention. An amount of polyvinyl alcohol in the range of about 35 to about 90 weight percent of the non-aqueous components of the size is dissolved in hot water with stirring. Separately, an amount in the range of about 3 to about 14 weight percent of the non-aqueous components of the size composition of a polyamide resin is added to about 1 to about 4 weight percent of the non-aqueous components of the size composition of acetic acid in hot water to form the water soluble salt of the polyamide resin. The salt of the polyamide resin and the polyvinyl alcohol resin are combined so that there is around at least five (5) times the amount of polyvinyl alcohol to polyamide resin. An amount in the range of about 1 to about 10 weight percent based on the non-aqueous components of the size composition of nonionic wetting agent, Igepal CA-360 is added to the combined mixture. At this point an amount in the range of 0.5 to about 3 weight percent based on the non-aqueous components of the size composition of an amino alkyl alkoxy silane is hydrolyzed in water and the resulting silanol solution is added to the main mix. An amount of textile softener, Cation-X such as alkyl imidazoline reaction product of tetraethylene pentamine and stearic acid in the range of about 5 to about 30 weight percent is dispersed in warm water and added to the main mix. An amount of antifoaming agent in the range of about 0.1 to about 1 weight percent is added to the main mix followed by the addition of the required amount of acetic acid necessary to adjust the pH in the range of from around 5 is added to the main mix. The resulting mix is diluted to the desired volume with water.

The size composition of the present invention is applied to individual glass fibers as they are drawn from orifices in an electrically heated, platinum alloy or ceramic bushing containing molten glass to form glass fibers. The glass fiber formed can have a diameter up to 0.00070 inches. The size is applied to the fibers prior to the time they are grouped together to form a strand containing many fibers usually around 200, by means of a roller applicator which is partially submerged in the sizing solution contained in a reservoir. Such an applicator is shown in more detail in U.S. Pat. No. 2,728,972. The fibers are then grouped into a strand or strands by a gathering shoe and wound on a forming package rotating at speeds around 4,400 rpm to produce a strand travel speed of around 14,000 feet per minute. Other methods of applying the size to the strand of glass fibers, such as a pad applicator, may be employed as the strand may be formed by means other than winding on the forming tube, such as by means of a pair of rotating wheel pullers which direct the strand into a suitable collecting device. The glass fiber strands are then wound on the forming package and dried. This may be done by any number of known methods sufficient to reduce the moisture level to that appropriate for further processing. For example, the strand may be dried from more than 0 to around 24 hours at ambient conditions.

After the strands are dried, they may be prepared as roving to enable the user of the glass fiber strand to prepare the glass fibers for its particular paper making application. Also the dried glass fibers may be chopped and provided to the user of glass fibers as chopped glass fibers to be used in the preparation of all glass paper or synthetic papers containing a portion of glass fibers and a portion of other fibers such as cellulose fibers. Also the glass fibers may be produced with the size composition of the present invention in the above-described manner except that instead of being wound onto a forming package after being gathered into a strand the strand is chopped in the wet condition to form a chopped glass fiber product which is then collected and dried. This chopped glass fiber product would then be supplied to the user for use in a paper making operation. The glass fiber produced in the aforementioned manner, and particularly larger diameter glass fibers will have improved dispersibility in aqueous solution to facilitate the formation of a slush for the preparation of a wet web in the paper making operation to produce 100 percent glass paper or a synthetic paper containing a portion of glass fibers and a portion of other synthetic or natural cellulose fibers.

The size composition, method of making same, and sized glass fibers are further illustrated in the following example.

EXAMPLE 1

An amount of Gelvatol 1-30 polyvinyl alcohol resin of 2,000 grams was dissolved in hot water with stirring. An amount of 200 grams of Versamid ® 140 polyamino functional polyamide resin with an amine value of 370-400 available from General Mills was added to 50 milliliters of acetic acid and hot water to form the water soluble acetate salt of the polyamide resin. Then the Gevatol 1-30 polyvinyl alcohol resin and the acetate salt of the Versamid ® 140 polyamide resin were combined. Then an amount of 80 milliliters of Igepal CA-630 was added to the combined mixture of the Gelvatol 1-30 and Versamid 140 resin. Then an amount of 40 grams of gamma-amino-propyl triethoxy silane available from Union Carbide Corporation under the grade name of A-1100 was hydrolyzed in water and the resulting silanol solution was added to the main mix. An amount of 40 grams of Cation X an alkyl imidazoline derivative available from Onyx Chemical Company was dispersed in warm water and added to the main mix. Then an amount of 10 milliliters of SAG 470 a silicone anti-foaming agent was added to the main mix and an additional amount of 50 milliliters of acetic acid was added to the main mix to adjust the pH of the size composition. The mix was then diluted to 10 gallons for application to glass fibers. The solids content of the size composition was 6.5 percent and the pH of the final composition was approximately 5.

The size composition of EXAMPLE I was applied to glass fibers of varying diameters and Table I presents data showing the perameters in the successful production of glass fibers sized with the sizing composition of the present invention.

TABLE I

| Glass Fiber Diameter fiber per strand | Binder Solids | pH | Viscosity of Composition 80 F. (26–27 C.) | Drying Time Minutes |
| --- | --- | --- | --- | --- |
| .00025/400 | 6.48 | 4.94 | 27 | 30 |
| .00025/400 | 6.53 | 5.09 | 25 | 30 |
| .00036/200 | 6.78 | 5.01 | 34 | 90 |

The foregoing has described a novel size composition, method of making same and sized glass fibers that lead to or have improved dispersibility in an aqueous solution. The glass fiber sized with the sizing composition of the present invention having improved dispersibility in aqueous solution is an excellent fiber for use in the paper making process because of the improved dispersibility in aqueous solutions. The size of the present invention renders a sized glass fiber that does not have the problems of conventionally sized glass fibers that they are difficult to disperse in the preparation of a slush in paper making processes. Glass fibers sized with composition of the present invention are readily dispersible in a slush used in the preparation of a wet web in the paper making process to such an extent that glass fibers with the diameter of 0.0038 can be used. The sized glass fibers including the large diameter fibers can be used to produce 100 percent glass paper or paper using a portion of glass fibers and a portion of other synthetic fibers or natural fibers such as cellulose fibers, or a glass-fiber-containing paper that can be substituted for conventional asbestos-fiber-containing paper for example that is used for reinforcement material for backing of vinyl flooring material.

I claim:

1. A forming size for glass fibers that renders sized glass fibers more dispersible in aqueous solutions, having as non aqueous components in the aqueous solution:
   about 35 to about 90 weight percent of polyvinyl alcohol,
   about 3 to about 14 weight percent of a polyamino functional polyamide resin formed from the condensation reaction product of a polycarboxylic acid and a polyamine, said polyamine having greater than 2 amine groups per molecule,
   wherein the amount of said polyvinyl alcohol is at least about 5 times the amount of the polyamino functional polyamide resin, about 1 to about 4 weight percent of an organic carboxylic acid having 1 to 5 carbon atoms used to react with the polyamino functional polyamide resin to form the carboxylic salt of a polyamino functional polyamide resin,
   about 1 to about 10 weight percent of a nonionic wetting agent,
   about 0.5 to about 3 weight percent of an amino-alkyl alkoxy silane,
   about 5 to about 30 weight percent of an alkyl imidazoline and about 1 to about 4 weight percent of an organic carboxylic acid having 1 to 5 carbon atoms to adjust the pH of the size composition in the range of about 4 to around 7.

2. The size composition of claim 1 wherein anti-foaming agent is added in an amount of about 0.1 to about 1 weight percent of the non-aqueous components in the aqueous size composition.

3. The forming size composition of claim 1 wherein the polyvinyl alcohol resin is prepared by the hydrolysis of polyvinyl acetate wherein the hydrolysis is 98 to 100 percent complete.

4. The forming size of claim 1 wherein the organic carboxylic acid is acetic acid.

5. The forming size of claim 1 wherein the nonionic wetting agent is octylphenoxypoly(ethyleneoxy) ethanol.

6. The forming size of claim 1 wherein the amino alkyl alkoxy silane is gamma-amino-propyl triethoxy silane.

7. The forming size of claim 1 wherein the alkyl imidazoline is the reaction product of tetraethylene pentamine and stearic acid.

8. The forming size of claim 2 wherein the anti-foaming agent is the aqueous solution containing a silicone oil, filler and emulsion stabilizer.

9. An improved glass fiber having improved dispersibility in aqueous solution having disposed on the glass fiber an amount of about 0.80 percent to about 2.5 percent by weight of the glass of the dried residue of an aqueous size having substantially:
   about 35 to 90 weight percent of a polyvinyl alcohol
   about 3 to about 18 weight percent of the salt of a polyamino functional polyamide resin, said polyamino functional polyamide salt being formed from the condensation reaction product of a polycarboxylic acid and a polyamine, said polyamine having greater than 2 amino groups per molecule and the carboxylic acid having 1 to 5 carbon atoms,
   wherein the amount of said polyvinyl alcohol is at least about 5 times the amount of the polyamino functional polyamide resin, about 1 to about 10 weight percent of a nonionic wetting agent,
   about 0.5 to about 3 weight percent of an amino alkyl alkoxy silane, and
   about 5 to about 30 weight percent of an alkyl imidazoline.

10. The strand of claim 9 wherein the dried residue on the strand contains about 0.1 to about 1 weight percent of a silicone containing anti-foaming agents.

11. The strand of claim 9 wherein the amino alkyl alkoxy silane is gamma-amino-propyl triethoxysilane.

12. The strand of claim 9 wherein the nonionic wetting agent is octyl phenoxy poly-(ethyleneoxy) ethanol.

* * * * *